United States Patent [19]

Sanders

[11] Patent Number: 5,384,753
[45] Date of Patent: Jan. 24, 1995

[54] SELF-ORIENTING SEISMIC DETECTOR

[75] Inventor: Joe I. Sanders, Sugar Land, Tex.

[73] Assignee: Western Atlas International, Inc., Houston, Tex.

[21] Appl. No.: 162,484

[22] Filed: Dec. 3, 1993

[51] Int. Cl.$^6$ .............................. H04R 17/00
[52] U.S. Cl. ...................... 367/163; 367/174; 367/180; 367/154; 367/20; 181/122
[58] Field of Search ............... 367/163, 174, 180, 178, 367/188, 154, 15, 20; 181/122

[56] References Cited

U.S. PATENT DOCUMENTS

| | | | |
|---|---|---|---|
| 3,911,388 | 10/1975 | Crump et al. | 367/178 |
| 4,322,829 | 3/1982 | Davis, Jr. et al. | 367/178 |
| 4,928,263 | 5/1990 | Armstrong et al. | 367/118 |
| 5,128,905 | 7/1992 | Arnott | 367/163 |

*Primary Examiner*—J. Woodrow Eldred
*Attorney, Agent, or Firm*—Arnold, White & Durkee

[57] ABSTRACT

A self-orienting seismic detector for detecting vertical acceleration regardless of the device's horizontal orientation. The detector comprises a housing fitted with diaphragms capable of generating signals. A mass is internally suspended within the housing between the diaphragms by means of a filament which is connected at each of its ends to one of the diaphragms. Vertical motion of the detector causes internal displacement of the mass within the housing. Motion by the mass within the cylinder is translated by the filament to the diaphragms which generate signals which may then be recorded. The detector may be incorporated within or attached to an undersea cable to form a seismic detection system primarily suitable for placement on an ocean bottom, but which may be employed in a towed array. In a primary embodiment, the detector is sealed from external pressure changes such that the stresses placed upon the detector's diaphragms will be governed by particle acceleration changes rather than pressure changes. In an alternative embodiment, the detector is exposed to external pressure. In this embodiment, the detector acts as a dual sensor-type system, incorporating the data gathering features of both a geophone and a hydrophone.

16 Claims, 3 Drawing Sheets

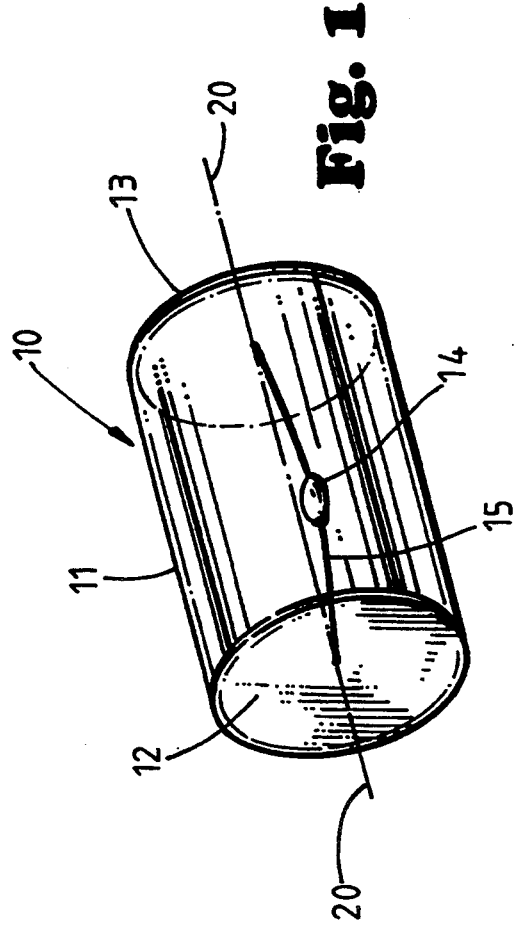
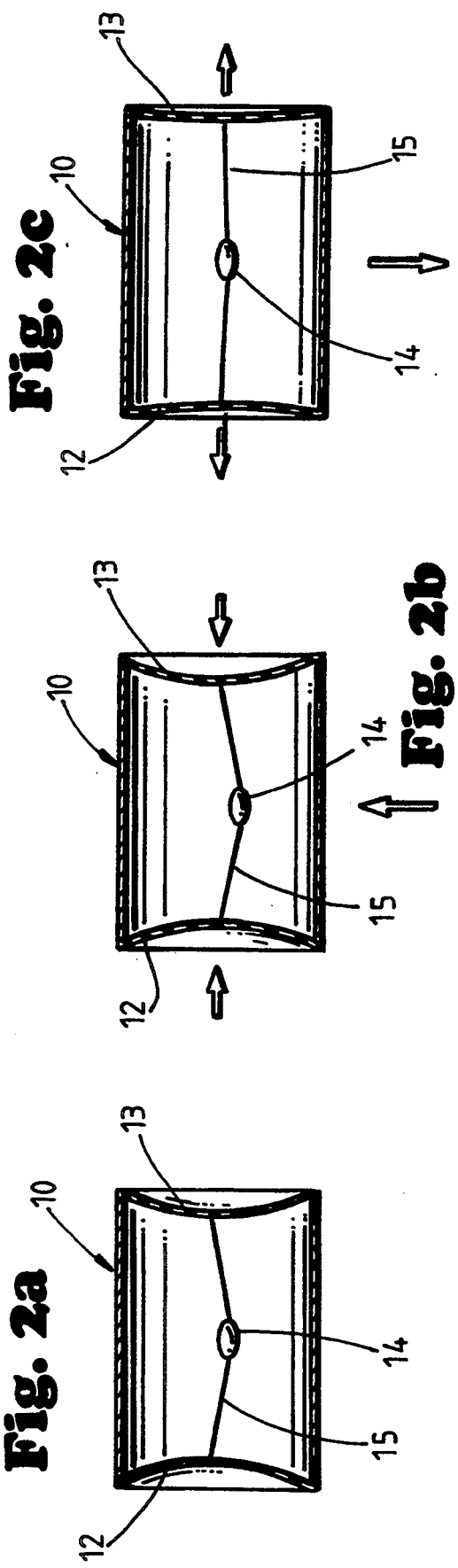

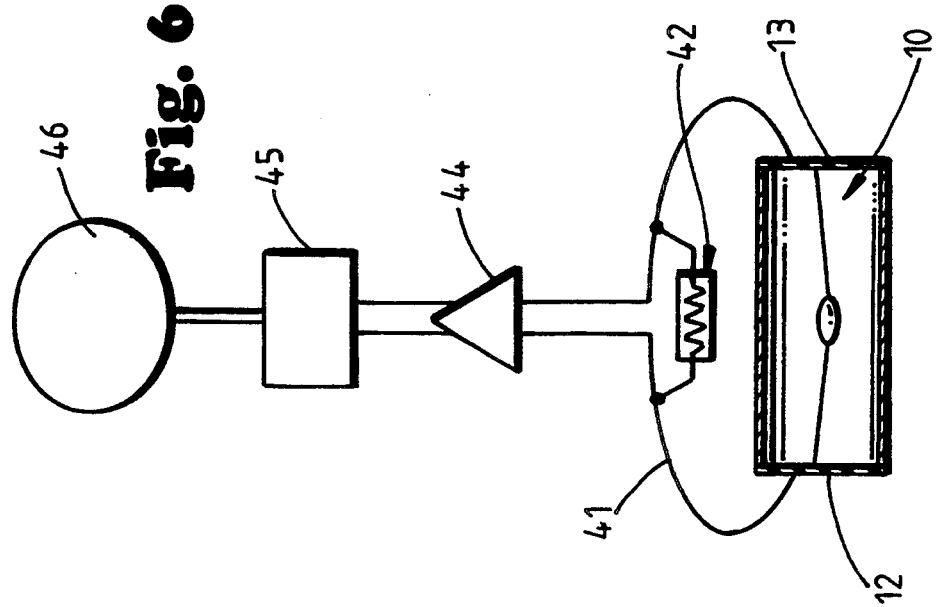
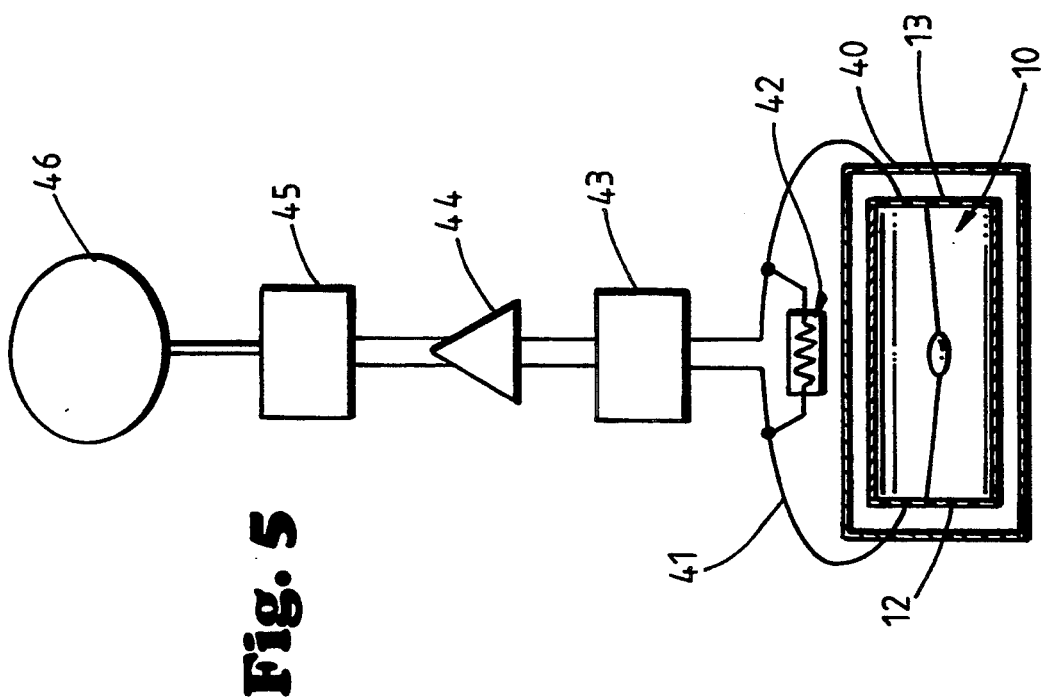

SELF-ORIENTING SEISMIC DETECTOR

BACKGROUND OF THE INVENTION

1. Field of the Invention

The invention relates generally to marine seismic exploration and surveying and, more particularly, relates to improved receiver systems for use in such marine seismic exploration.

2. Description of Related Art

Marine seismic surveying is generally conducted using a seismic survey vessel equipped with an energy source and seismic detector for taking seismic profiles of an underwater land configuration. The source is typically an air gun or explosive device which imparts an acoustic wave to the water, creating a wavefield which travels coherently into the underlying earth. As the wavefield propagates through the underlying earth, it strikes interfaces between formations commonly referred to as strata, and reflects back through the earth and water toward a receiver. The receiver converts the reflected signals to electrical signals which are recorded and may then be analyzed to determine geological details of formations beneath the sea bottom.

Among the seismic detectors typically used are geophones, which are devices sensitive to particle motion, and hydrophones, devices responsive to changes in pressure. Geophones detect particle motion and changes in velocity or acceleration of particle motion which result from vibrations in the external environment and are inherently directional in nature. Hydrophones detect changes in pressure, generally without regard to direction.

A frequently employed type of detector arrangement consists of a series of hydrophone/geophone pairs which are attached to or incorporated within an elongated sensor cable towed by the seismic survey vessel and which is then positioned on the sea bottom. The energy source of the towing survey vessel emits seismic signals from predetermined locations usually by means of an airgun or explosive device. The seismic signals generated by the source are reflected back from strata beneath the ocean bottom. The reflected signals are then recorded by the hydrophone/geophone pairs. In some instances, the sensor cable is towed behind the vessel during recording rather than being deployed upon the ocean bottom.

The hydrophones are employed as receivers for reflected seismic pressure waves. The geophones record fluid particle motion changes induced by the seismic signals. The simultaneous recording of particle motion and pressure is a well known method for improving the signal-to-noise ratio in seismic recording.

A long standing problem in marine surveying of this type has been the presence of "ghost" wavefields which may obscure the actual subterranean wavefield reflections. Ghost wavefields result from re-reflection of the upwardly moving reflected wavefield downwards from the water's surface. Ghost signals pose a problem in the recording of seismic data by obscuring data in some frequencies while amplifying data in others.

The most common type of hydrophone includes a piezoelectric element which converts physical pressure signals into electrical signals. Conventional geophones are typically constructed of a coil of wire which is positioned within a magnetic field and contained within a housing. The coil is suspended by springs and tends to remain fixed in space due to its mass, while the housing and magnetic structure move in response to motion within the environment, such as that induced by a seismic source. The relative movement of the wire coil within the magnetic field induces an electrical voltage across the coil, approximating motion within the environment. A damping resistor is typically connected across the coil to create a loop and thereby permit current to flow through the coil in relation to the relative acceleration of the coil with respect to the magnetic field. The current acts to damp the coil's motion by means of magnetic forces which act upon the electrified coil. This damping facilitates a more accurate representation of seismic signals detected by the device.

Maintenance of geophone-style devices in a proper orientation is necessary for a seismic survey to be relatively accurate. This may be difficult as the cable may end up rotated about its own longitudinal axis as it reaches the sea floor. It is also difficult to economically anchor the cable properly to the sea floor. As a result, the associated geophone may become horizontally disoriented and be unable to accurately determine changes in the vertical component of acceleration.

A number of devices have been developed in an attempt to meet this need. The incorporation of gimbals into geophones has been proposed. However, in practice these devices have not been generally successful in correcting geophones misoriented beyond about 20° or more. In addition, gimbaled geophones are costly and complex to manufacture. The complexity of the unit tends to make it prone to leakage and mechanical damage as well as difficult to repair. Fluid-filled self-orienting vertically sensitive accelerometers have also been developed but have not found widespread acceptance.

A number of devices and methods have also been proposed for elimination or minimization of the "ghost" wavefield signals from the signals which are intended to be collected by the sensors. The combination of a vertical component accelerometer with a hydrophone, for instance, has been proposed for cancelling surface-reflected noise in marine seismic operations. The success of these devices, in dealing with the problem, however, is not clear.

A need exists for a device which addresses the problems of ghost wavefields and geophone misorientation.

SUMMARY OF THE INVENTION

The invention features an improved seismic detector which may be termed self-orienting in that it is capable of detecting and measuring the generally vertical component of fluid particle acceleration regardless of the detector's horizontal orientation. In a preferred embodiment, the detector comprises a housing which is open at either end. The ends of the housing are fitted with diaphragms such as piezoelectric plates capable of generating a signal in response to an induced force upon the plate. A mass is internally suspended within the housing between the diaphragms. The mass is typically suspended by means of a filament which is connected at each of its ends to one of the diaphragms.

Changes in vertical acceleration of the detector will cause internal displacement of the mass within the housing. Motion by the mass within the cylinder will then be translated by the filament to the diaphragms which will generate signals which may be recorded.

The detector may be incorporated within or attached to an undersea cable to form a seismic detection system primarily suitable for placement on an ocean bottom, but which may be employed in a towed array.

It is primarily envisioned that the detector is utilized while sealed from external pressure changes such that the stresses placed upon the detector's diaphragms will be governed by particle acceleration changes rather than pressure changes. An alternative embodiment is contemplated wherein the detector is exposed to external pressure. In this embodiment, the detector acts as a dual sensor-type system, incorporating the data gathering features of both a geophone and a hydrophone. In this configuration, pressure changes acting upon the detector should essentially offset signals induced from changes in particle acceleration for downward or ghost signals while upward traveling signals will be enhanced.

BRIEF DESCRIPTION OF THE DRAWINGS

FIG. 1 is a schematic depiction of an exemplary seismic detector constructed in accordance with the present invention.

FIGS. 2A-C illustrate preferred operation of the exemplary seismic detector of FIG. 1 in response to vertical motion.

FIG. 5 illustrates components of a seismic detection assembly in an exemplary arrangement wherein the detector is not exposed to external pressures.

FIG. 6 illustrates components of a seismic detection assembly in an exemplary arrangement wherein the detector is exposed to external pressures.

DETAILED DESCRIPTION OF PREFERRED EMBODIMENTS

Figure 4:
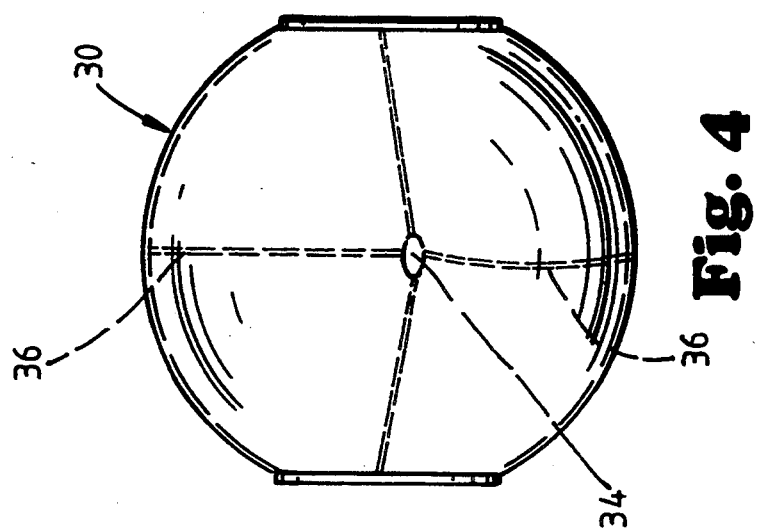
FIG. 4 shows an exemplary seismic detector 30 having a spherically shaped housing.

FIG. 1 depicts an exemplary seismic detector 10 which has been constructed in accordance with the present invention. The device includes a housing 11 which is preferably rigid. In one preferred embodiment, the housing 11 is cylindrical in shape, However, housings which are spherical, box-shaped or of other shapes would also be suitable. FIG. 4 illustrates an alternately constructed seismic detector 30 having a housing 31 which is roughly spherical in shape.

Referring once more to FIG. 1, the housing 11 is typically fashioned of brass or a similar suitable material and should present two opposite open ends. These ends are fitted, in a conventional manner, with diaphragms 12 and 13 which are formed to generally match the housing 11's open ends. Diaphragms 12 and 13 typically comprise piezoelectric plates of type which are known in the art and are generally used currently with conventional hydrophones. Such plates operate by generating an electrical signal in response to mechanical stresses exerted upon portions of the plate.

A mass 14 is suspended within housing 11 by means of a filament or spring 15 which is connected at either end to the diaphragms 12 and 13. Preferably, the filament 15 is drawn somewhat less then taut between the diaphragms 12 and 13 so that the mass 14 may be moved upward or downward within the housing 11. As FIG. 4 illustrates, where the housing 31 of detector 30 is spherically shaped, additional filaments 36 may be used to attach the mass 34 to any number of points about the interior surface of the housing 31.

The size and weight of the mass 14 must be determined relative to the thickness and flexibility of the diaphragms 12 and 13. The mass should create a static load on the plates sufficient to cause some response by the plates but permit additional load to generate an increased response. A suitable filament for use with the detector of the present invention would be preferably only slightly elastic so as to permit suitable natural damping of motion of the mass 14 with respect to the housing 11.

As illustrated in FIGS. 2A-C, changes in vertical particle acceleration acting upon the detector 10 will impart forces to the diaphragms 12, 13 to indicate such motion. FIG. 2A illustrates exemplary detector 10 at rest. While at rest, the weight of mass 14 exerts a static amount of force through filament 15 to diaphragms 12 and 13. This static load may be considered a base line signal or a signal of zero. FIG. 2B illustrates reaction of detector 10 to upward particle acceleration such as might occur upon an encounter with an upwardly moving seismic wave. As shown, the mass 14 moves downward with respect to the housing 11. The downward motion of mass 14 results in differential stress being imparted through filament 15 to diaphragms 12 and 13. The signal generated by the diaphragms 12 and 13 may then be assigned a convention such as positive to denote upward acceleration upon the detector 10.

FIG. 2C illustrates the effect of downward particle acceleration action upon the detector 10. As shown, downward acceleration by detector 10 results in the mass 14 being moved upward with respect to the housing 11. As a result, the forces are transmitted through filament 15 to the diaphragms 12 and 13. A negative convention may be assigned to the signal generated by the plates in response to downward acceleration.

It is noted that the generally vertical component of acceleration may be readily determined by detector 10 regardless of the orientation of the housing 11 about its longitudinal axis 20. As a result, the detector 10 should be capable of determining changes in the vertical component of acceleration without regard to alterations in the associated cable's orientation within the water.

In a primary embodiment illustrated in FIG. 5, the detector 10 is sealed against the effects of external pressure changes. This may be accomplished by placing the detector within a pressure-resistant casing shown schematically at 40. In this embodiment, the detector would function generally as a geophone with the signals generated from diaphragms 12 and 13 governed essentially by particle acceleration changes rather than pressure changes. FIG. 5 further illustrates an exemplary arrangement for a seismic detection assembly incorporating a sealed detector 10 and a recording device 46. The assembly includes suitable wiring 41 and a damping circuit 42 of a type known in the art which is used to reduce signal noise induced by excessive oscillation of portions of the detector 10. An integrator 43, preamplifier 44 and digitizer 45 may also be provided.

In operation in the pressure-sealed embodiment, the seismic detection assembly functions much like a conventional geophone. Signals created by diaphragms 12 and 13 are transmitted by the wiring 41 toward the recording device 46. The signal is then refined by damping circuit 42 and converted from an acceleration-based signal into a velocity-based signal by the integrator 43. This signal is then refined by the preamplifier 44 and transmitted to the recording device 46. The digitizer 45 may be used to convert an analog signal to a digital one for use by a suitable recording device 46. One suitable recording apparatus is the Halliburton MDS 18X Seismic Recording Device. Other suitable devices are known in the art.

In an alternative embodiment, the diaphragms 12 and 13 may be presented in use so that they are exposed to below-water pressures and changes in those pressures. The baseline signal for the detector 10 while it is at rest should be determined after the detector has reached its desired depth. The movement and action of mass 14 and filament 15 upon the diaphragms 12 and 13, as described earlier, will then assist in removal of "ghost" signals during seismic testing. Pressure from the "ghost" wavefield developing downward from the water's surface should generate an inward pressure upon both diaphragms 12 and 13. As illustrated in FIG. 2C, the signal generated by the inward pressure should be largely offset by the effect of downward particle acceleration (illustrated in FIG. 2C) generated by the ghost signal. As a result, both ghost signals should nearly cancel each other out. The employment of offsetting pressure and acceleration signals to reduce ghost signals is well established. See, e.g., U.S. Pat. No. 4,486,865 issued to Ruehle. The resultant signal generated by diaphragms 12 and 13 should then be essentially that of the response of detector 10 to the pressure and particle acceleration changes induced by the upwardly traveling primary seismic wave.

FIG. 6 schematically illustrates the components typically employed in an exemplary arrangement wherein the diaphragms 12 and 13 are exposed to external pressures. As may be seen, the components employed are similar to those used in the sealed-against-pressure mode with the absence of the integrator 43. When the detector is employed this manner, it may serve a dual sensor-type arrangement as it is capable of generating responsive signals to changes in both pressure and particle acceleration. The detector of the present invention thereby incorporates data-gathering features from both the geophone and hydrophone and reduces the need to separately record changes in pressure and changes in vertical particle acceleration.

Figure 3:
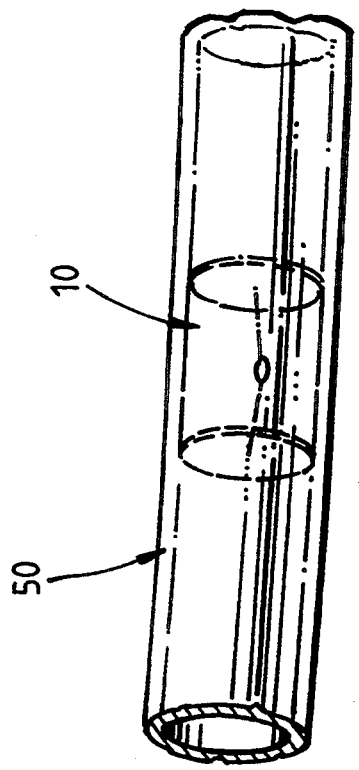
FIG. 3 depicts an exemplary seismic detector 10 as incorporated into a towed cable assembly.

In operation, the detector 10 may incorporated into or attached to either a marine streamer in a conventional manner or a sub-sea cable which would then be either towed by a marine survey vessel or deployed along an ocean bottom. In either configuration, the detector 10 will be aligned with the streamer or cable and oriented such that when the streamer or cable is positioned into a horizontal attitude housing 11 is turned on its side and the diaphragms 12 and 13 face horizontally outward. FIG. 3 schematically depicts exemplary seismic detector 10 incorporated into a towed streamer assembly 50. One technique for incorporation of a seismic detector into a marine seismic cable assembly is described in U.S. Pat. No. 5,046,056 issued to Sallas et al. which is hereby incorporated by reference. Others are known in the art.

Those skilled in the art will recognize that many modifications may be made to the apparatus described above without departing from the spirit of the invention. Accordingly, the present invention has been described by way of preferred embodiments merely by way of illustration rather than limitation. It is to be understood that the invention is not limited to the embodiments set forth herein for the purposes of exemplification, but is to be limited only by the scope of the attached claims and equivalents of the elements thereof.

What is claimed is:

1. A seismic detector comprising:
   (a) a housing having two ends and being open at either end;
   (b) a pair of diaphragms, each said diaphragm being positioned to substantially cover one open end of said cylinder, each said diaphragm further being operable to generate a signal in response to mechanical stress placed upon said diaphragm;
   (c) at least one filament, said filament being connected to one of said diaphragms so as to impart mechanical stress upon portions of said diaphragms; and
   (d) a mass attached to said filament, said mass being internally suspended within said housing between said diaphragms so as to be moveable relative to said housing, the motion between the mass and housing creating differential stress upon portions of said diaphragms.

2. The detector of claim 1 wherein the diaphragms comprise piezoelectric plates.

3. The detector of claim 1 wherein the housing is generally cylindrical.

4. The detector of claim 1 wherein the housing is generally spherical.

5. The detector of claim 1 wherein the diaphragms are exposed to changes in external pressure.

6. The detector of claim 1 wherein the diaphragms are limited in exposure to changes in external pressure.

7. A seismic detection assembly comprising:
   (a) a seismic cable configured to be employed in a marine environment;
   (b) at least one seismic detector incorporated into the cable, said seismic detector comprising:
      1) a housing having two ends and being open at either end;
      2) a pair of diaphragms, each said diaphragm being positioned to substantially cover one open end of said cylinder, each said diaphragm further being operable to generate a signal in response to mechanical stress placed upon said diaphragm;
      3) at least one filament, said filament being connected to one of said diaphragms so as to impart mechanical stress upon a portion of said diaphragm; and
      4) a mass attached to said filament, said mass being internally suspended within said housing, between said diaphragms so as to be moveable relative to said housing the motion between the mass and housing creating differential stress upon portions of said diaphragms.

8. The seismic detection assembly of claim 7 wherein at least one of said diaphragms comprises a piezoelectric plate.

9. The seismic detection assembly of claim 7 wherein the housing is generally cylindrical.

10. The seismic detection assembly of claim 7 wherein the housing is generally spherical.

11. The seismic detection assembly of claim 7 wherein the diaphragms are exposed to changes in external pressure.

12. The seismic detection assembly of claim 7 wherein the diaphragms are limited in exposure to changes in external pressure.

13. The seismic detection assembly of claim 7 further comprising an integrator operable to convert an acceleration-based signal into a velocity-based signal.

14. The seismic detection assembly of claim 7 further comprising a digitizer operable to convert an analog signal into a digital signal.

15. The seismic detection assembly of claim 7 further comprising a damping circuit operable to reduce oscillation-based noise from a signal.

16. The seismic detection assembly of claim 7 further comprising a preamplifier.

* * * * *

UNITED STATES PATENT AND TRADEMARK OFFICE
CERTIFICATE OF CORRECTION

PATENT NO. : 5,384,753
DATED : Jan. 24, 1995
INVENTOR(S) : Joe I. Sanders

It is certified that error appears in the above-indentified patent and that said Letters Patent is hereby corrected as shown below:

Column 3, line 41, the comma should be a period.

Signed and Sealed this

Fifteenth Day of August, 1995

Attest:

BRUCE LEHMAN

Attesting Officer     Commissioner of Patents and Trademarks